United States Patent
Crosby et al.

(10) Patent No.: US 7,263,208 B1
(45) Date of Patent: Aug. 28, 2007

(54) AUTOMATED THRESHOLD SELECTION FOR A TRACTABLE ALARM RATE

(75) Inventors: Frank Crosby, Panama City, FL (US); Suzanne Stetson, Panama City Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 805 days.

(21) Appl. No.: 10/637,080

(22) Filed: Aug. 4, 2003

(51) Int. Cl.
*G06K 9/00* (2006.01)
(52) U.S. Cl. .................................. 382/103; 382/224
(58) Field of Classification Search ............... 382/103, 382/107, 173, 181, 190, 221, 224
See application file for complete search history.

(56) References Cited

U.S. PATENT DOCUMENTS 5,960,097 A * 9/1999 Pfeiffer et al. ............. 382/103
6,724,916 B1 * 4/2004 Shyu ......................... 382/103

* cited by examiner

*Primary Examiner*—Duy M. Dang
(74) *Attorney, Agent, or Firm*—James T. Shepherd

(57) ABSTRACT

A method and system for selecting a threshold for use in detecting anomalous objects, or targets, in images with a tractable false alarm rate. A method includes steps of identifying a number of peak values from a plurality of values; calculating an average peak value from the identified peak values derived in the previous step; and calculating the threshold according to the average peak value; the number of identified peak values; and a predetermined number of false alarms. In this manner, object classifications are accurate; the number of false alarms is reduced; and redundant classifications are minimized for each image.

22 Claims, 8 Drawing Sheets

PRIOR ART

AUTOMATED THRESHOLD SELECTION FOR A TRACTABLE ALARM RATE

GOVERNMENT RIGHTS

The invention described herein may be manufactured and used by or for the Government of the United State of America for governmental purpose without payment of any royalties thereon or therefor.

BACKGROUND OF THE INVENTION

The present invention generally relates to automated target recognition and, more specifically, relates to an automated system and method for detecting anomalous objects in images with a tractable false alarm rate.

Automated target recognition (ATR) systems and processes may be employed in image analysis to determine if an image includes a specific object or target, such as a fingerprint. These systems generally comprise software; a database or directory of known target images; and a target image; i.e., an image having one or more areas to be analyzed for determination of the presence or absence targets. Generally, the system invokes the software to search the target image and compares areas suspected of having targets to known target images in the database. The known target images may comprise one or more object or target prototypes acquired, for example, from camera, infrared scanners, stored images, satellites, and other sources. Various methods may be employed for the search function, including intensity methods and feature-based methods.

Certain ATR systems include pre-processing functions to identify candidate portions of the target image that potentially contain a match to a known image. The system then focuses on the candidate portion for further processing, excluding the remaining areas of the target image. Exemplary applications of ATR techniques include identification of fingerprint, hand or retina; identification of a specific face from group photographs; and identification of types and numbers of enemy aircraft photographed using satellite technology.

Generally, ATR comprises three phases: data acquisition, data processing, and decision classification. During the data acquisition phase, a data acquisition subsystem gathers data from the physical world through a sensor and converts it to digital formats suitable for computer processing; for example, an image. During the data processing phase, or target detection phase, a data potentially contain targets. The data processing subsystem assigns a numerical value, or value, to each region or each pixel. The numerical value correlates to a potential for a specific region to contain a target or for a specific pixel to represent a target. During the decision classification phase, a decision classification subsystem dichotomizes each assigned value according to whether the value represents a target or not.

Target and background characteristics play a significant role in target image processing and classification. Certain targets comprise unique, immutable patterns and characteristics that permit absolute matching with a known image and, therefore, permit absolute classification. Fingerprints, for example, fall into this category. Further, such targets can be displayed on a uniform background, such as white paper, and absolute distinction between the fingerprint and its associated background can be made. Such distinction permits analysis of the fingerprint and exclusion of the background, thus simplifying the analysis and classification process. Other targets, such as synthetic or manufactured items, generally comprise uniform characteristics. For example, mines often exhibit highly geometrical structures, permitting the shape of such a target to be specified with near certainty.

A system used in imaged detection of the foregoing type is disclosed in U.S. Pat. No. 6,501,857 to Gotsman et al. The system uses a group of the eigenvectors having the weakest eigenvalues to select basis vectors. A second process is then performed on this group of "weakest" eigenvectors to identify a set of candidate vectors, ordered in terms of "smoothness." The set of basis vectors is then chosen from the candidate vectors in order of smoothness, which are then applied in an image detection or image recognition process.

Another system and apparatus of the prior art is disclosed in U.S. Pat. No. 5,710,833 to Moghaddam et al., for detecting instances of a selected object or object feature in a digitally represented scene. The system and apparatus utilize analysis of probability densities to determine whether an input image (or portion thereof) represents such an instance. The invention filters images of objects that, although in some ways are similar to the object under study, fail to qualify as typical instances of that object. The invention is useful in the detection and recognition of virtually any multi-featured entity such as human faces, features thereof, and non-rigid and articulated objects such as human hands.

Various target images, however, contain varying and variegated background areas. Such images evade standard analysis and classification techniques due to an inability to absolutely distinguish a suspect target from its surrounding background. Examples of the foregoing include target images having background areas of sand, grass, clay and other natural surrounds. Analysis and classification ability degrades even further under conditions where both the potential targets and the background areas of the target image contain characteristics deviating from known images, precluding exact target classification.

Anomaly detection schemes may be employed in situations where exact target classification is not feasible. Anomaly detection methods search for contrast differences between areas in the target image rather than searching for a specific pattern within the target image, based on the assumption that a majority of the target image comprises uninteresting and similar areas. Therefore, a target occurs as an anomaly with respect to most of the target image.

Common anomaly detection algorithms are derived from standard tests of statistical hypothesis. These tests typically rely on a small number of assumptions regarding the distribution type of the samples. Statistical tests relate the observed samples in the target images to standard distributions, such as the normal distribution, F-distribution, and t-distribution.

Theoretically, the output values of the initial analysis follow one of the aforementioned distributions and selection of a threshold can be made based on a predetermined confidence level, for example 95%. The rate of false alarms; i.e., non-anomalous areas that surpass the threshold, may then be obtained by multiplying the number of samples and the difference between 100% and a confidence level. For example, in an application having a confidence level of 95% and 100 samples, the false alarm rate is gauged at five according to the foregoing formula. The detection rate may be based on the specific characteristics of the targets. In cases where very little is known about the target characteristics, thresholds are traditionally based on false alarm rates.

The FX target detection algorithm is one example of an adaptive constant false alarm rate technique using spatial and contrast information, *Signature Adaptive Mine Detec-* tion At A Constant False Alarm Rate, Crosby, F. and Riley, S., Proceedings of SPIE Detection and Remediation Technologies for Mines and Minelike Targets IV, April 2001. Another example is an algorithm disclosed in *Comparative Performance Analysis of Adaptive Multispectral Detectors*, Yu, X., Reed, I., and Stocker, A., *IEEE Transactions on Signal Processing*, Vol. 41, No. 8, August 1993.

The FX algorithm is a scalar-valued function of the potentially multi-dimensional quantities of average target intensity, average background intensity, and common covariance of the background and the target. Statistically, the distributions are assumed to be normal with means $\mu_B$ and $\mu_T$ and common covariance $\Sigma$, denoted $N(\mu_B, \Sigma)$ and $N(\mu_T, \Sigma)$, respectively. The detection metric is calculated as:

$$F(X) = \frac{N_B N_T}{N}(\mu_B - \mu_T)^T \sum\nolimits^{-1}(\mu_B - \mu_T).$$

The theoretical false alarm output of the FX algorithm follows the F-distribution. The specific F-distribution is determined by the number of dimensions and the number of samples used in estimating the target and background averages. FIG. 1 shows a graph having an x-axis 1 and a y-axis 2 of the F-distribution for six dimensions and 1,674 samples, according to the prior art.

Ideally, the threshold could be selected based on a graph of this type. In reality, however, achieving a certain confidence level is quite difficult. Given the same target dimensions and the same number of samples, the actual output for two sets of input can vary significantly. An example of this variability can be seen in FIGS. 2 and 3, each according to the prior art. FIG. 2 illustrates a graph having an x-axis 3 and a y-axis 4, and the graphical output from a target image having background areas of sand. The number of objects is shown along the y-axis 3 and the corresponding detection value is shown along the x-axis 4. FIG. 3 illustrates a graph having an x-axis 5, a y-axis 6, and the graphical output from a target image having background areas of grass. The number of objects is shown along the y-axis 6, and the corresponding detection values are shown along the x-axis 5. As can be seen, FIG. 2 contains many representations of detection values over twelve, while FIG. 3 has none. Although both outputs have the same small number of true targets, selection of a threshold value of twelve, for example, results in many false alarms in the grass case (FIG. 2) yet results in no false alarms in the sand case (FIG. 3).

Further, common anomaly detection methods of the prior art employed to analyze images having targets larger than one pixel typically process each output pixel in the target-sized area, resulting in undesirable redundant classifications.

As can be seen, there is a need for a system and method of independent threshold selection on a per-image basis. Further, such a system and method preferably provide a threshold based only on a desired number of false alarms per image. Finally, there is a need for a system and method of independent threshold selection that minimizes duplicate classifications within a given area of the image.

SUMMARY OF THE INVENTION

A method of the present invention includes steps of identifying a number of peak values from a plurality of values; calculating an average peak value from the identified peak values derived in the previous step; and calculating the threshold according to the average peak value, the number of identified peak values, and a predetermined number of false alarms.

Another method of the present invention includes steps of (a) identifying and storing a peak value from the plurality of values; (b) identifying a pixel in the plurality of pixels corresponding to the peak value and storing a location of the identified pixel; (c) bounding an area around the location of the identified pixel, the area corresponding in size to an area of a known target image; (d) excluding from further processing each pixel within the bounded area and the value associated therewith; (e) repeating steps (a) through (d) until the peak value is less than or equal to an insignificant value; (f) calculating an average peak value from the stored peak values; (g) calculating a threshold according to the average peak value; (h) calculating a number of objects having values exceeding the threshold; (i) identifying a highest peak value in the determined peak values; (l) excluding from further processing the current highest peak value, and calculating a new average peak value derived from the remaining identified peak values; (k) calculating a new threshold based on the new peak average; (l) calculating a new number of objects having values exceeding the new average peak value; and (m) if the new number of objects is greater than the number of objects, then replacing the number of objects with the new number of objects and repeating steps (j), (k), (l), and (m) until the new number of objects remains constant in value.

Yet another method of the present invention includes steps of (a) identifying and storing a peak value from the plurality of values; (b) identifying a pixel in the plurality of pixels corresponding to the peak value and storing a location of the identified pixel; (c) bounding an area around the location of the identified pixel, the area corresponding in size to an area of a known target image; (d) excluding from further processing each pixel within the bounded area and the value associated therewith; (e) repeating steps (a) through (d) until the peak value is less than or equal to an insignificant value; (f) calculating an average peak value from the stored peak values; (g) calculating a threshold according to the formula:

$$T = -\mu \ln(K/N)$$

wherein T represents the threshold, $\mu$ represents the average peak value, K represents the predetermined number of false alarms, and N represents the number of identified peak values; (h) calculating a number of objects having values exceeding the threshold; (i) identifying a highest peak value in the determined peak values; (j) excluding from further processing the current highest peak value, and calculating a new average peak value derived from the remaining identified peak values; (k) calculating a new threshold according to the formula:

$$\hat{T} = -\hat{\mu} \ln(K/N),$$

wherein $\hat{T}$ is the updated threshold, $\mu l$ is the new average value, N is the new number of objects, and K is the predetermined number of false alarms; (l) calculating a new number of objects having values exceeding the new average peak value; and (m) if the new number of objects is greater than the number of objects, then replacing the number of objects with the new number of objects and repeating steps (j), (k), (l) and (m) until the new number of objects remains constant in value.

Still another method of the present invention includes steps of (a) acquiring data; (b) converting the data to an image having a plurality of pixels; (c) analyzing the plurality of pixels and assigning each pixel a respective value from a plurality of values; (d) identifying and storing a peak value from the plurality of values; (e) identifying a pixel in the plurality of pixels corresponding to the peak value and storing a location of the identified pixel; (f) bounding an area around the location of the identified pixel, the area corresponding in size to an area of a known target image; (g) excluding from further processing each pixel within the bounded area and the value associated therewith; (h) repeating steps (d) through (g) until the peak value is less than or equal to an insignificant value; (i) calculating an average peak value from the stored peak values; (j) calculating a threshold according to the average peak value; (k) calculating a number of objects having values exceeding the threshold; (l) identifying a highest peak value in the determined peak values; (m) excluding from further processing the current highest peak value and calculating a new average peak value derived from the remaining identified peak values; (n) calculating a new threshold based on the new peak average; (o) calculating a new number of objects having values exceeding the new average peak value; and (p) if the new number of objects is greater than the number of objects, then replacing the number of objects with the new number of objects and repeating steps (m), (n), (o) and (p) until the new number of objects remains constant in value.

An aspect of the present invention includes a storage medium for storing the image and the plurality of values; a peak value generator for identifying a number of peak values from the plurality of values; and a calculator for calculating an average peak value from the identified peak values derived in the previous step and calculating the threshold according to the average peak value, the number of identified peak values, and a predetermined number of false alarms.

Another aspect of the present invention includes a storage medium for storing the image and the plurality of values; a peak value generator for identifying a number of peak values from the plurality of values, the peak value generator further comprising an identifier and storage unit for identifying and storing a peak value from the plurality of values and identifying a pixel in the plurality of pixels corresponding to the peak value and storing a location of the identified pixel; an area determinator for bounding an area around the location of the identified pixel, the area corresponding in size to the area of a known target image; and a comparison and repeater module for excluding from further processing each pixel in the plurality of pixels within the bounded area and the value in the plurality of values associated therewith and invoking the identifier and storage unit and area determinator until the peak value is less than or equal to an insignificant value; and a calculator for calculating an average peak value from the identified peak values derived in the previous step and calculating the threshold according to the average peak value, the number of identified peak values, and a predetermined number of false alarms.

A further aspect of the present invention includes a database having at least one known target image; an image having a plurality of pixels; a plurality of values, each value in the plurality of values corresponding to a respective pixel in the plurality of pixels; a storage medium for storing the image and the plurality of values; a peak value generator for identifying a number of peak values from the plurality of values, each peak value in the number of peak values corresponding to an area of the image equivalent to an area of the at least one known target image; and a calculator for calculating an average peak value from the identified peak values derived in the previous step and calculating the threshold according to the average peak value, the number of identified peak values, and a predetermined number of false alarms.

A still further aspect of the present invention includes a memory coupled to a processor, the processor operable to process the output of associated plurality of values; identify a number of peak values from the plurality of values; calculate an average peak value from the identified peak values derived in the previous step; and calculate a threshold according to the average peak value, the number of identified peak values, and a predetermined number of false alarms.

Yet another aspect of the present invention includes a code segment for identifying a number of peak values from the plurality of values; a code segment for calculating an average peak value from the identified peak values derived in the previous step; and a code segment for calculating a threshold according to the average peak value, the number of identified peak values, and a predetermined number of false alarms.

Still another aspect of the present invention includes a memory coupled to a processor, the processor operable to process the plurality of values; identify and storing a peak value from the plurality of values; (b) identify a pixel in the plurality of pixels corresponding to the peak value and storing a location of the identified pixel; (c) bound an area around the location of the identified pixel, the area corresponding in size to an area of a known target image; (d) exclude from further processing each pixel within the bounded area and the value associated therewith; (e) repeat functions (a) through (d) until the peak value is less than or equal to an insignificant value; (f) calculate an average peak value from the stored peak values; (g) calculate a threshold according to the average peak value; (h) calculate a number of objects having values exceeding the threshold; (i) identify a highest peak value in the determined peak values; (j) exclude from further processing the current highest peak value and calculating a new average peak value derived from the remaining identified peak values; (k) calculate a new threshold based on the new peak average; (l) calculate a new number of objects having values exceeding the new average peak value; and (m) if the new number of objects is greater than the number of objects, then replace the number of objects with the new number of objects and repeat the previous four functions until the new number of objects remains constant in value.

An additional aspect includes (a) a code segment for identifying and storing a peak value from the plurality of values; (b) a code segment for identifying a pixel in the plurality of pixels corresponding to the peak value and storing a location of the identified pixel; (c) a code segment for bounding an area around the location of the identified pixel, the area corresponding in size to an area of a known target image; (d) a code segment for excluding from further processing each pixel within the bounded area and the value associated therewith; (e) a code segment for invoking the code segment (a) through (d) until the peak value is less than or equal to an insignificant value; (f) a code segment for calculating an average peak value from the stored peak values; (g) a code segment for calculating a threshold according to the average peak value; (h) a code segment for calculating a number of objects having values exceeding the threshold; (i) a code segment for identifying a highest peak value in the determined peak values; (j) a code segment for excluding from further processing the current highest peak value and calculating a new average peak value derived from the remaining identified peak values; (k) a code segment for calculating a new threshold based on the new peak average; (l) a code segment for calculating a new number of objects having values exceeding the new average peak value; and (m) a code segment for determining if the new number of objects is greater than the number of objects, and, if so, then replacing the number of objects with the new number of objects and invoking code segments (j), (k), (l), and (m) until the new number of objects remains constant in value.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally relates to a method and system for detecting anomalous objects, or targets, in images with a tractable false alarm rate. Typically, the method of the present invention follows an initial analysis of input images, where any detection algorithm or process can be used to assign a numerical value to each pixel in an image. Comparison of the value of a pixel with a threshold value determines whether the pixel represents a target; i.e., for each value associated with a respective pixel, if the value is greater than an established threshold value, then the corresponding pixel is classified as a target, subject to a predetermined number of false alarms (non-anomalous objects having a numerical value exceeding the threshold value).

More specifically, the present invention provides for automatic and independent selection of a threshold value, or threshold, for each analyzed image. Contrary to inventions of the prior art, which only permit selection of a single threshold value for all processed images, the present invention's independent threshold selection on a per-image basis allows for variances between images (such as background or target variances). Because the present invention partially predicates threshold selection on specific characteristics of each image, the resultant classifications are increasingly accurate over the prior art, the number of false alarms is reduced, and redundant classifications are minimized for each image.

The system and method of the present invention are particularly applicable to anomaly detection algorithms that analyze an image and generate an output (a set of values generated from an initial analysis of an image, each value in the set of value corresponding to a respective pixel in the image). The output may then be modeled by an exponential distribution. For example, the F-distribution can be approximated with the exponential distribution. The system and method of the present invention may be embodied in software, hardware, any combination thereof, or other components suited to carry out the invention functions described herein.

Figure 1:
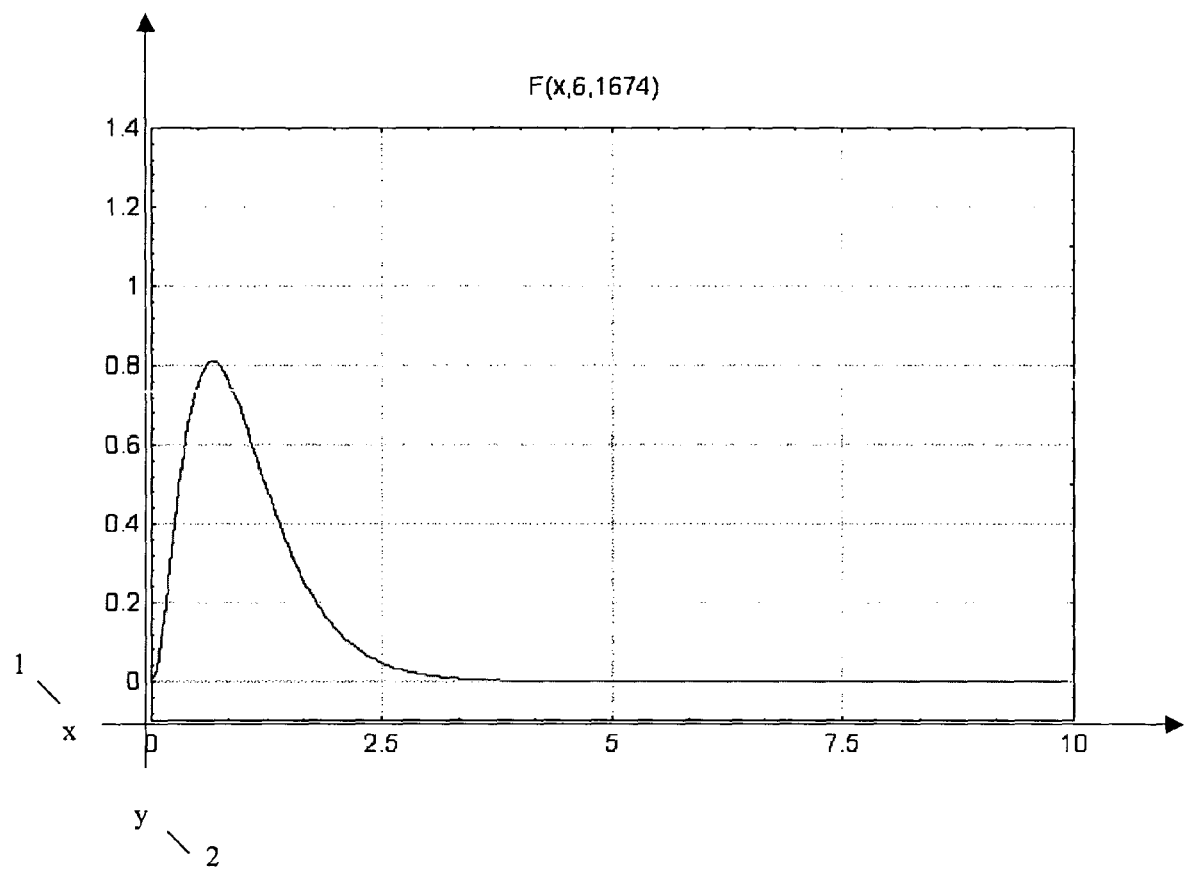
FIG. 1 illustrates a graphical representation of an F-distribution output from analysis of 1,674 samples of a target image for a known target image having six dimensions according to the prior art.
Figure 2:
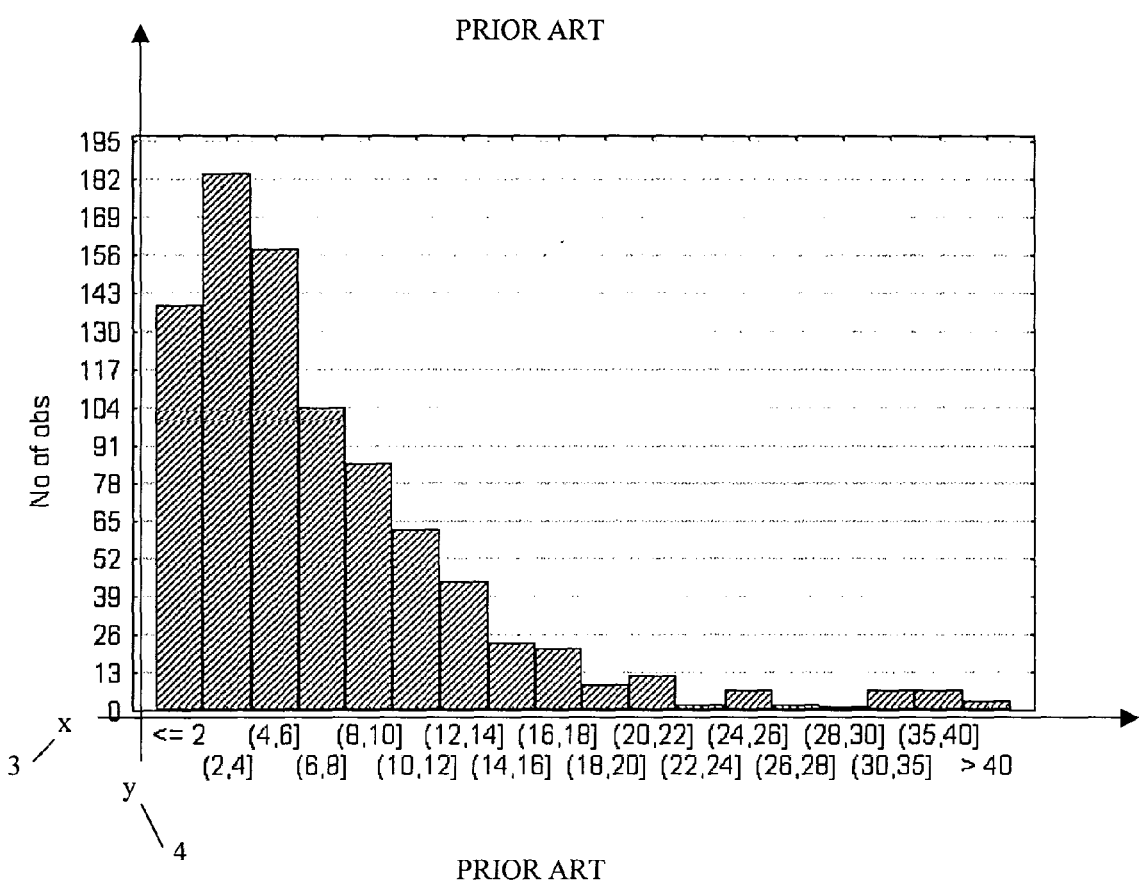
FIG. 2 illustrates a graphical representation of the F-distribution output of the analysis of FIG. 1, wherein the target image further comprises background areas of sand, according to the prior art.
Figure 3:
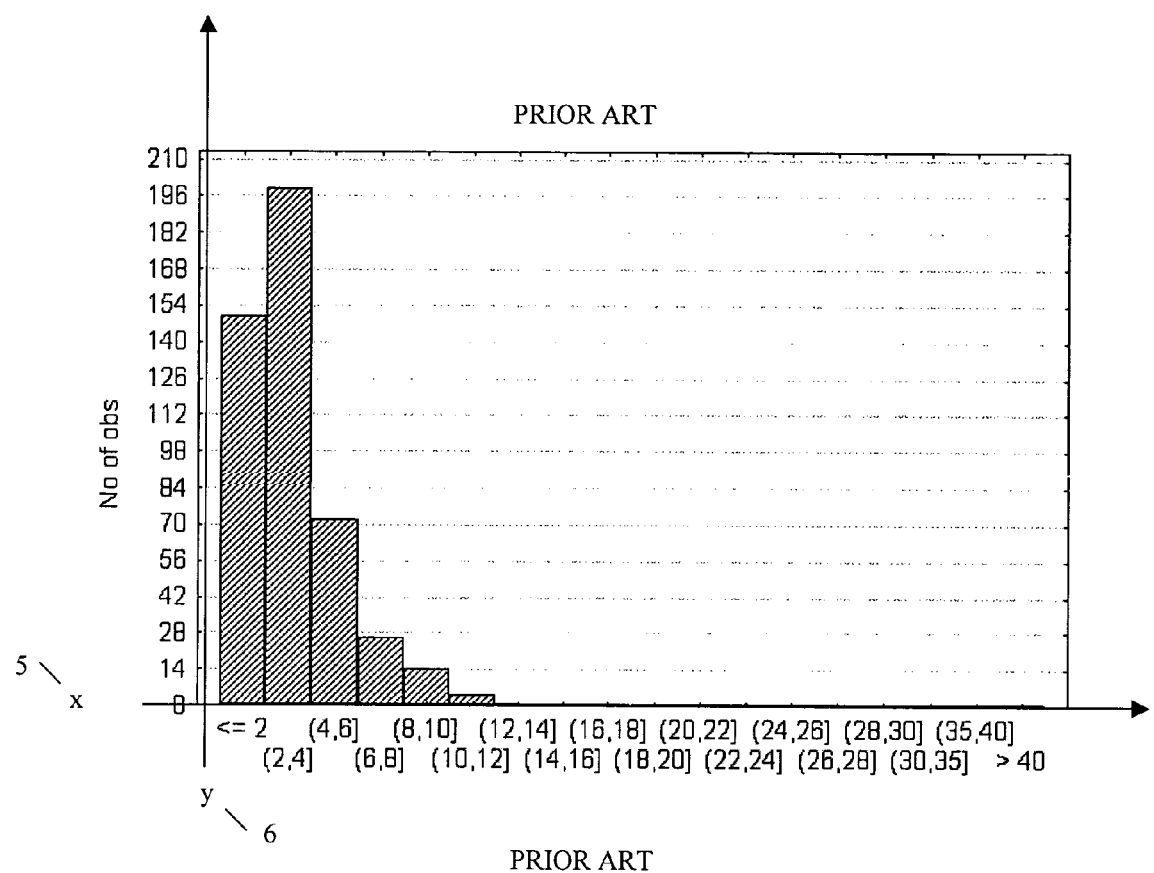
FIG. 3 illustrates a graphical representation of the F-distribution output of the analysis of FIG. 1, wherein the target image further comprises background areas of grass, according to the prior art.
Figure 4:
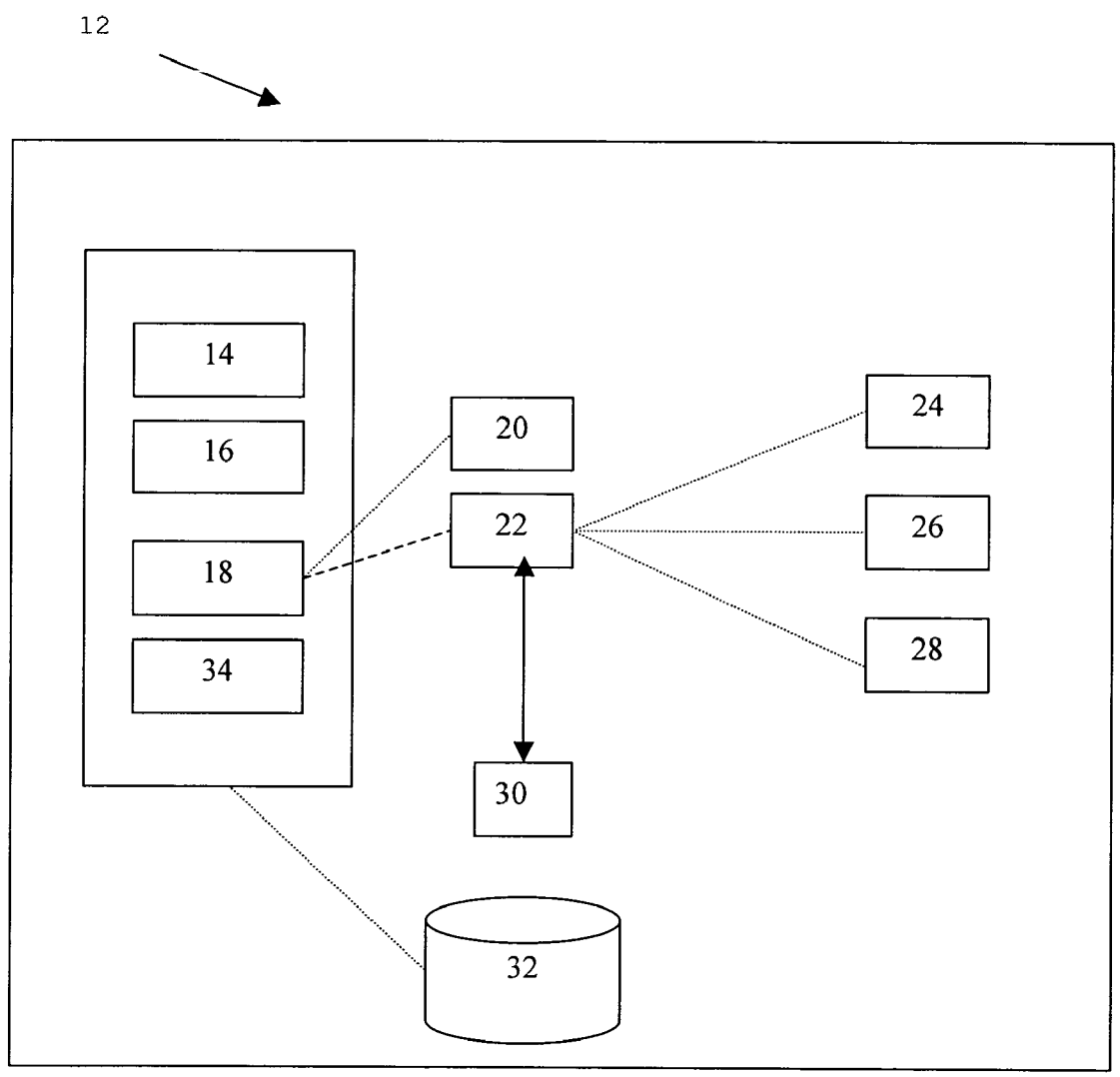
FIG. 4 illustrates a prior art schematic representation of a computer system.

For example, one embodiment of the present invention includes computer software executing within a computer system. FIG. 4 shows an exemplary computer system generally designated 12. The computer system 12 may include, for example, a main memory 14, preferably random access memory (RAM) 16, and a secondary memory 18. The secondary memory 18 may include a hard disk drive 20 and a removable storage device 22, such as a floppy disk drive 24, a magnetic tape drive 26, and a compact disk drive 28. The removable storage drive 22 reads from and writes to a removable storage unit 30 in any manner well known in the art.

The removable storage unit 30, also called a program storage device or a computer program product, represents computer readable media, which may include a floppy disk, magnet tape, and a compact disk. The removable storage unit 30 may include a computer usable storage medium having therein stored computer software and data. Further, a computer storage medium such as a database 32 may be utilized.

Computer programs (also called computer control logic) and including code segments may be stored in main memory 14 and secondary memory 16. Such code segments, when executed, enable the computer system 12 to perform the functions of the present invention as further described herein. In particular, the code segments, when executed, enable components of the computer system 12, such as a processor 34, to perform the functions of the present invention.

Alternative embodiments of the present invention are directed to a computer program product comprising a computer readable medium having control logic (computer software) stored therein. The control logic, when executed by the processor 34, causes the processor 34 to perform the functions as further described herein.

Further embodiments of the present invention are implemented primarily in hardware using, for example, a hardware state machine (not shown). Implementation of the hardware state machine so as to perform the functions described herein will be apparent to persons skilled in the relevant arts.

Figure 5:
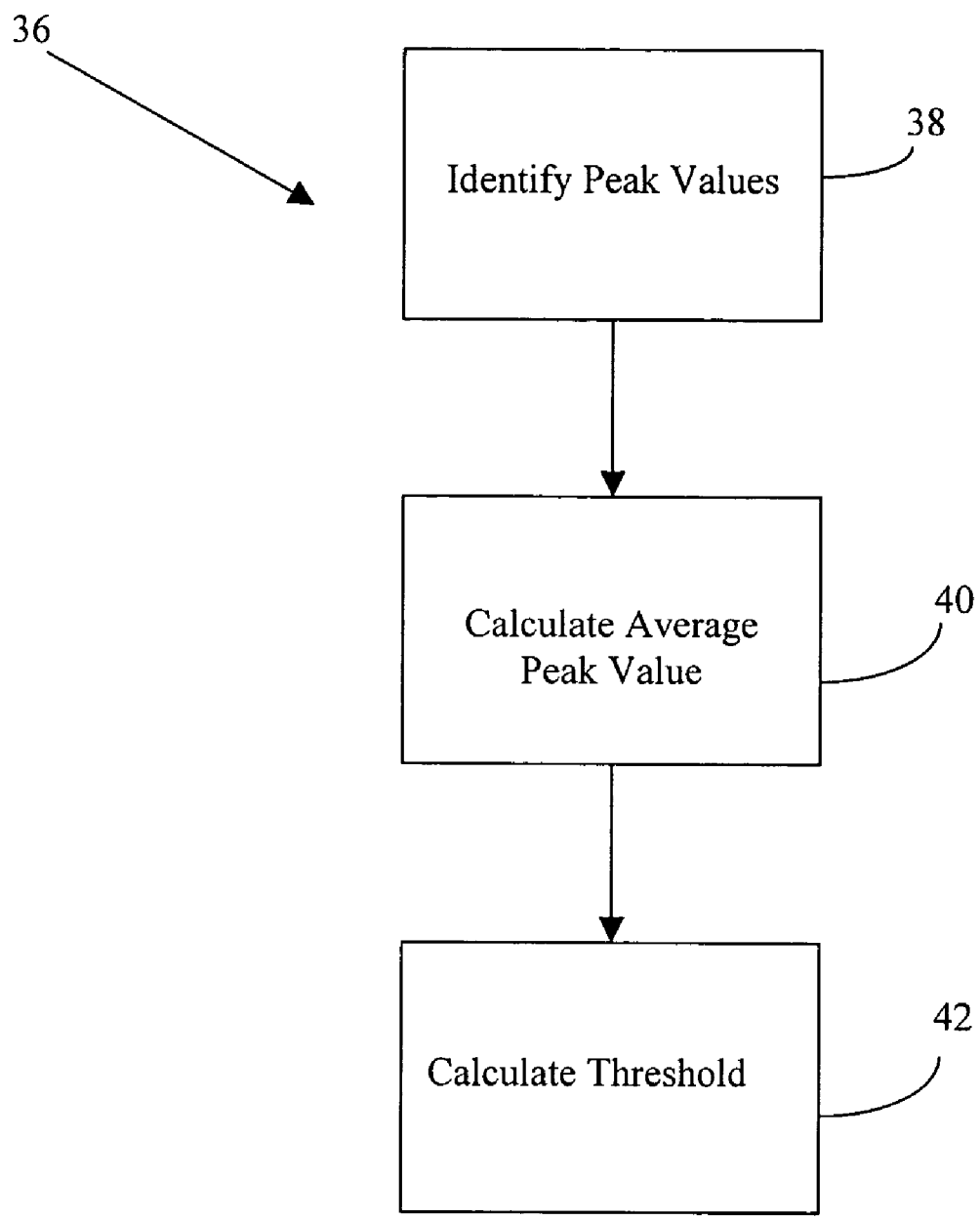
FIG. 5 illustrates a flowchart of a method according to an embodiment of the present invention.

With reference to FIG. 5, there is shown a method 36 for threshold selection according to an embodiment of the present invention. In a simple format, the method 36 for threshold selection may initially analyze the set of values generated by an anomaly detection scheme to identify a number of peak values from the plurality of values at a step 38. A peak value constitutes the highest value or a range of highest values with respect to a given set of values during a particular iterative step. At a step 40, an average peak value may then be calculated from the identified peak values derived in the previous step 38. The threshold value, or threshold, may then be calculated using, for example, the average peak value, the number of identified peak values, and a predetermined number of false alarms at a step 42. An exemplary formula for calculation of the threshold may be:

$$T=-\mu \ln(K/N),$$

wherein T represents the threshold, $\mu$ represents the average peak value, K represents the predetermined number of false alarms, and N represents the number of identified peak values. All pixels (or areas) associated with the identified peak values derived using the foregoing method may be considered representative of either a true target or a false alarm.

Figure 6:
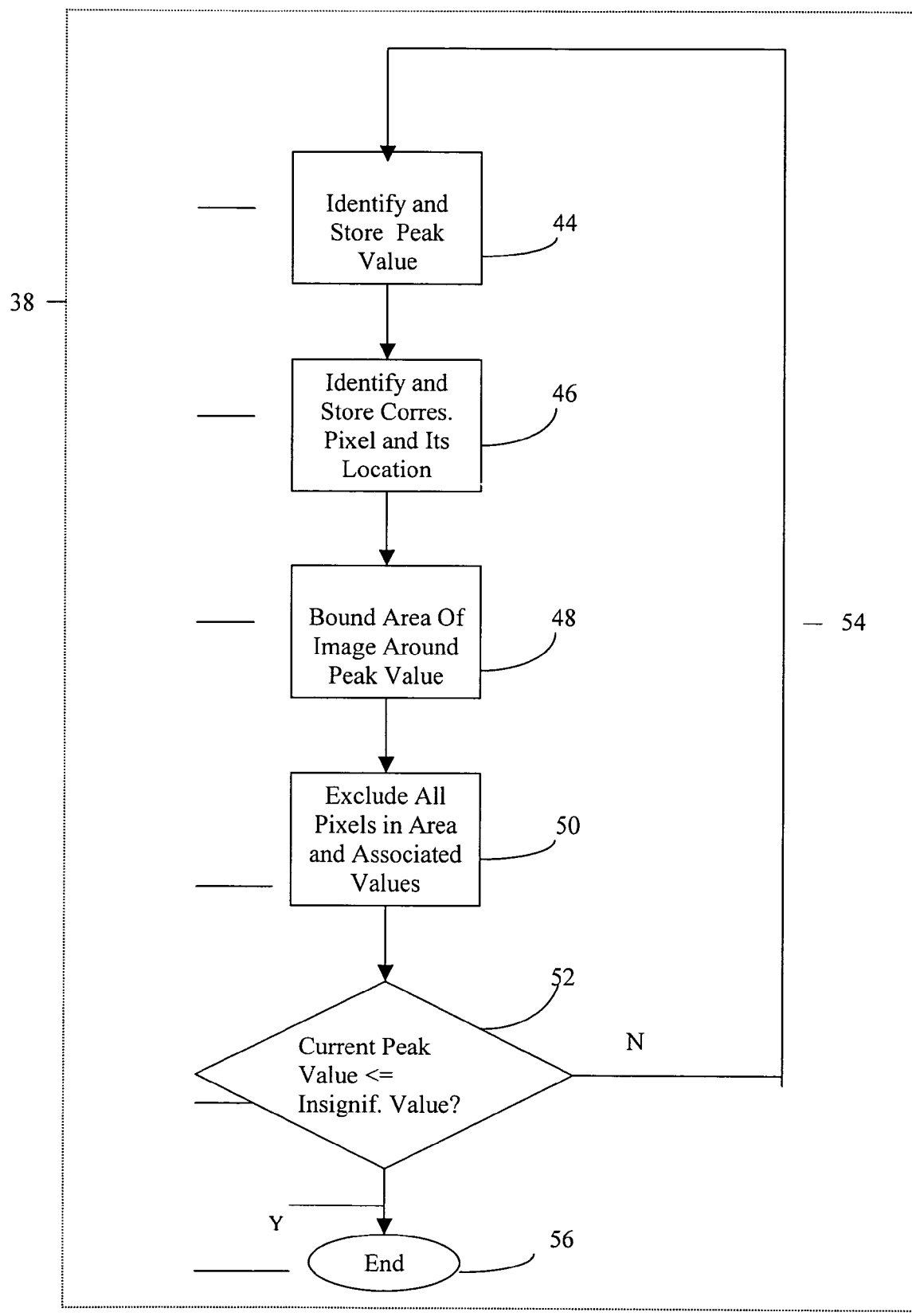
FIG. 6 illustrates a flowchart of a sub-process of the method of FIG. 5, according to an embodiment of the present invention.

With reference to FIG. 6, the step of identifying a number of peak values (shown at 38 in FIG. 5) may be further expanded to include steps of identifying, from the set of output values, a peak (highest) value and storing the peak value in, for example, memory at a step 44. A pixel in the analyzed image that corresponds to the identified peak value may then be identified and a location in the image of the identified pixel may be stored at a step 46. At a step 48, an area in the image around the location of the identified peak value may be bounded. The area may be determined according to various schemes. For example, the area may correspond in size, shape or both to an area of a known target image stored in and selected from, for example, a database populated with known target images. At a step 50, all pixels within the bound area and the values corresponding to such pixels can be excluded from further processing. At 52, the peak value is compared to an insignificant value. At a step 54, the foregoing steps may be repeated until the peak value of the current iteration is less than or equal to the insignificant value at a step 52.

The insignificant value may be determined via various methods. One such method, system noise calculation, relates to system noise traced from an input device for images; for example, a camera. The system noise calculation may include steps of selecting a highest value of the brightness range; determining a subject noise percentage; and calculating the insignificant value according to the subject noise percentage of the highest value of the brightness range. For example, if a camera has an output imagery with a brightness range scaled from zero to 255 and the camera is subject to noise of approximately 1%, then pixel brightness variations of up to three may be meaningless. A simple translation, without regard to an impact of the specific operations, of the noise to the detection output would adjudge detection values (pixel values) less than three as insignificant.

Another method to determine the insignificant value is theoretical prediction. Theoretical predications are based on similarities between the exponential distribution and a theoretical output. For example, if the theoretical output is an F-distribution, then exponential distribution matches the output when the two functions are decreasing. Steps may include determining theoretical output of values according to an F-distribution; determining an exponential distribution of values; and calculating the insignificant value according to a value representing a match between the exponential distribution and the theoretical output.

An alternate step for the step of calculating the threshold (shown at 42 in FIG. 5) may be useful in image analysis where the subject images contain natural objects as well as targets. Under such circumstances, it is desirable to include a test for skewing of the exponential-distribution due to a few very high peak values. The threshold obtained by disregarding the highest of the peak values should not introduce any more false alarms. If it does, then a new calculated threshold may be more representative of the false alarms than the initial calculated threshold.

Figure 7:
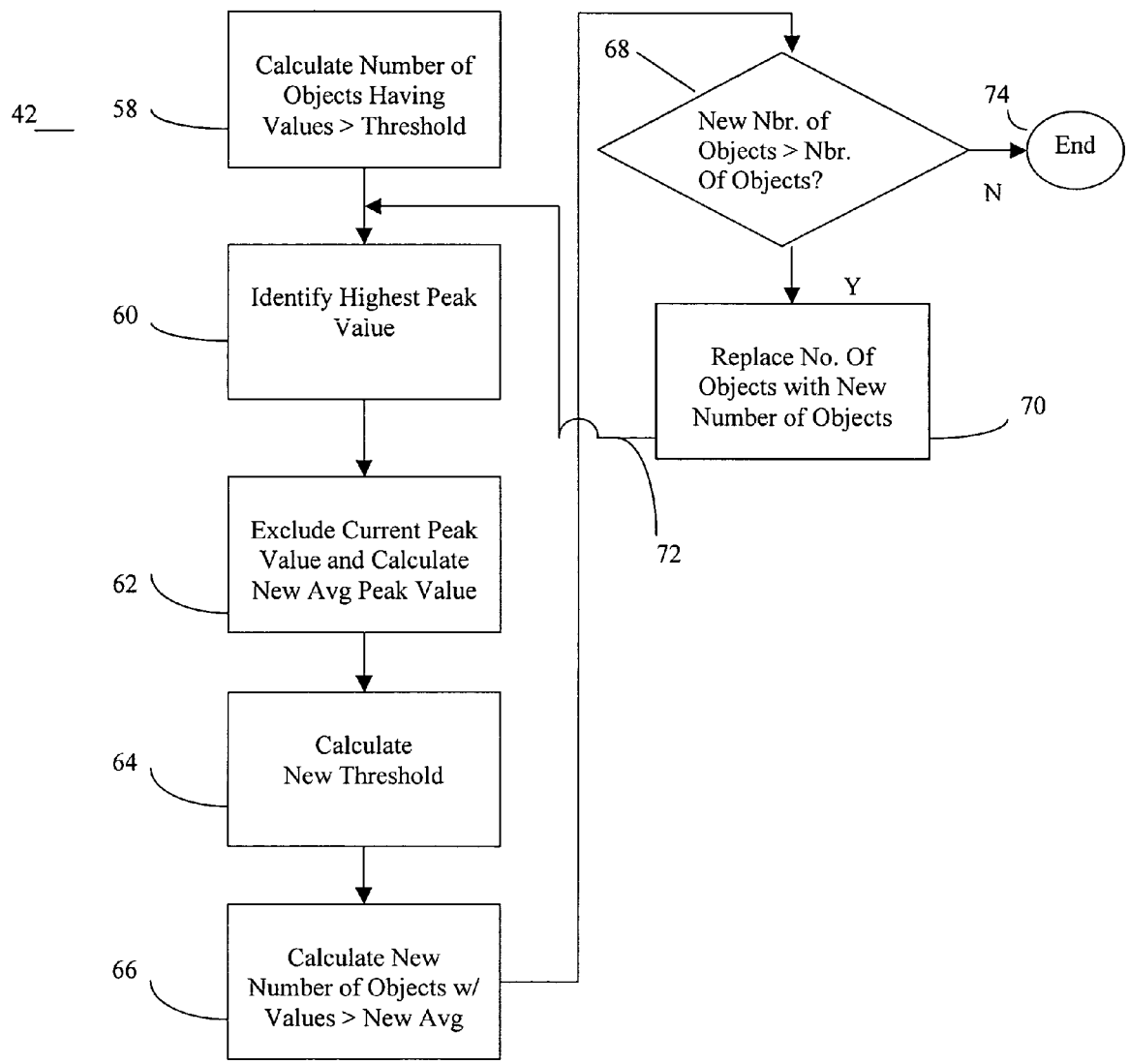
FIG. 7 illustrates another sub-process of the method of FIG. 5, according to an embodiment of the present invention.

In FIG. 7, the alternate step for threshold calculation may further comprise steps of calculating a number of objects; i.e., image areas or pixels, having values exceeding the threshold at a step 58; identifying a highest peak value in the determined peak values at a step 60; excluding from further processing the current highest peak value and calculating a new average peak value derived from the remaining identified peak values at a step 62; calculating a new threshold based on the new peak average at a step 64; calculating a new number of objects having values exceeding the new average peak value at a step 66; and if the new number of objects is greater than the number of objects at a step 68, then replacing the number of objects with the new number of objects at a step 70 and, at a step 72, repeating the preceding steps starting at step 62 (excluding from further processing the current highest peak value and calculating a new peak average) until the new number of objects remains constant in value at a step 74.

The new threshold may be calculated, for example, using the formula:

$$\hat{T}=-\hat{\mu} \ln(K/N),$$

wherein $\hat{T}$ is the updated threshold, $\hat{\mu}$ is the new average value, N is the new number of objects, and K is the predetermined number of false alarms.

Figure 8:
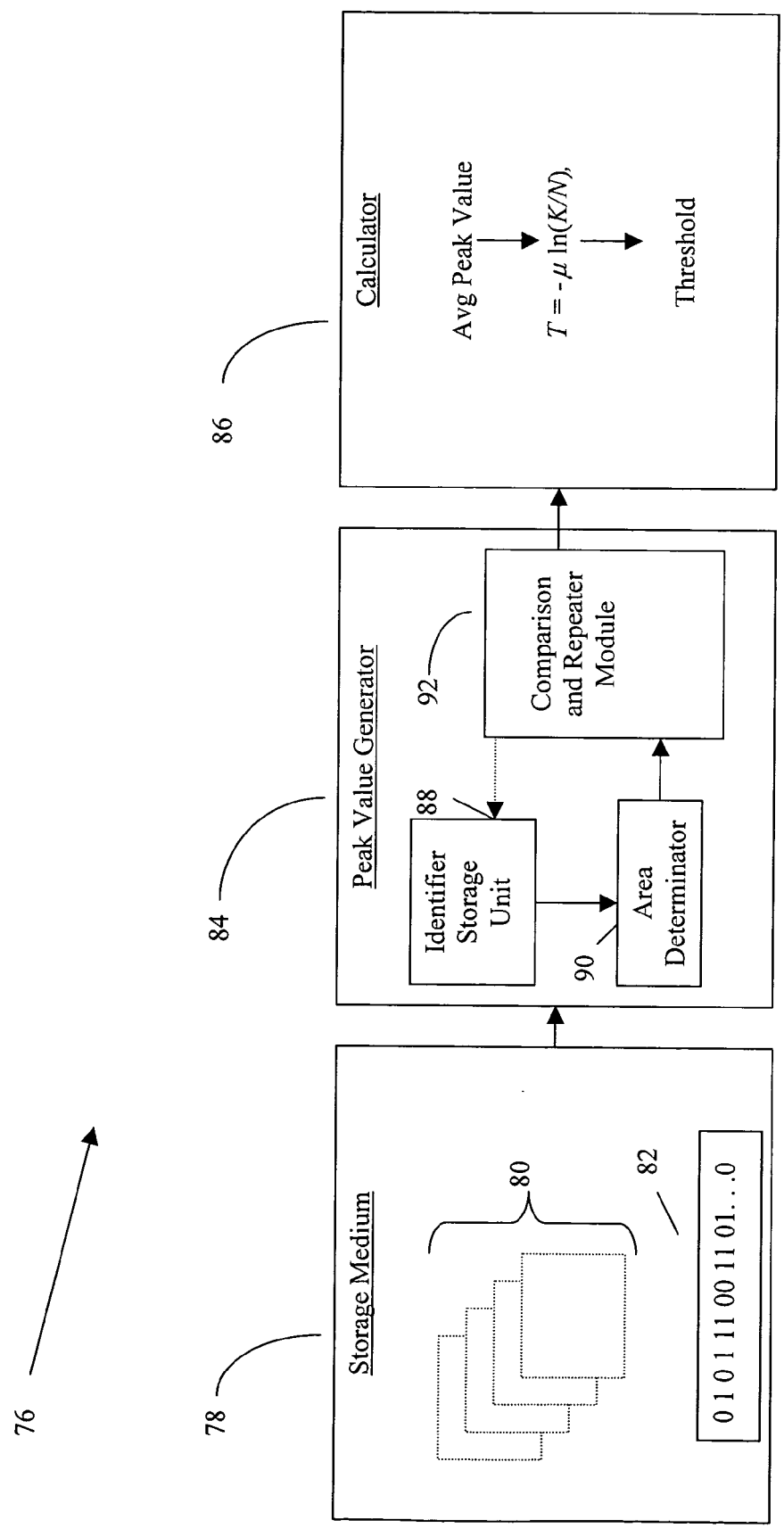
FIG. 8 illustrates a system according to an embodiment of the present invention.

With reference now to FIG. 8, a system 76 according to an embodiment of the present invention may be used to determine the threshold for image analysis using, for example, an output of values from an anomaly detection algorithm. The values may correspond to a respective pixel in the image. The system 76 may comprise a storage medium 78 for storing images 80 and the plurality of values 82; a peak value generator 84 for identifying a number of peak values from the plurality of values 82; and a calculator 86 for calculating an average peak value from the identified peak values derived in the previous step and calculating the threshold according to the average peak value, the number of identified peak values, and a predetermined number of false alarms. For example, the threshold calculation may comprise the formula:

$$T=-\mu \ln(K/N),$$

wherein T represents the threshold, $\mu$ represents the average peak value, K represents the predetermined number of false alarms, and N represents the number of identified peak values.

The peak value generator 84 may further comprise, for example, an identifier storage unit 88; an area determinator 90; and a comparison and repeater module 92. The identifier and storage unit 88 may be used to identify and store a peak value from the plurality of values and may be used to identify a pixel in the plurality of pixels corresponding to the peak value and store a location of the identified pixel. The area determinator 90 may be used to designate a boundary around the location of the identified pixel. The bounded area may be determined by various schemes, including one that selects the area of a known target image stored in, for example, a database. The comparison and repeater module 92 may be used to exclude from further processing each pixel in the plurality of pixels within the bounded area and the value in the plurality of values associated therewith and may be used to invoke the identifier and storage unit 88 and area determinator 90 until the peak value is less than or equal to an insignificant value. The insignificant value may be determined according to various processes, including the aforedescribed methods.

Alternatively, the calculator 86 may employ a process for threshold determination that includes the alternative step, supra, as illustrated in FIG. 7. The new threshold determination according to the alternative step may be calculated according to the formula:

$$\hat{T} = -\hat{\mu} \ln(K/N),$$

wherein $\hat{T}$ is the updated threshold, $\hat{\mu}$ is the new average value, N is the new number of objects, and K is the predetermined number of false alarms.

It should be understood, of course, that the foregoing relates to preferred embodiments of the invention and that modifications may be made without departing from the spirit and scope of the invention as set forth in the following claims.

We claim:

1. A method for threshold selection in analysis of an image having a plurality of pixels and a plurality of values, each value in the plurality of values corresponding to a respective pixel in the plurality of pixels, the method comprising steps of:
   (a) identifying and storing a peak value from the plurality of values;
   (b) identifying a pixel in the plurality of pixels corresponding to the peak value and storing a location of the identified pixel;
   (c) bounding an area around the location of the identified pixel, the area corresponding in size to an area of a known target image;
   (d) excluding from further processing each pixel within the bounded area and the value associated therewith;
   (e) repeating steps (a) through (d) until the peak value is less than or equal to an insignificant value;
   (f) calculating an average peak value from the stored peak values;
   (g) calculating a threshold according to the average peak value;
   (h) calculating a number of objects having values exceeding the threshold;
   (i) identifying a highest peak value in the determined peak values;
   (j) excluding from further processing the current highest peak value and calculating a new average peak value derived from the remaining identified peak values;
   (k) calculating a new threshold based on the new peak average;
   (l) calculating a new number of objects having values exceeding the new average peak value; and
   (m) if the new number of objects is greater than the number of objects, then replacing the number of objects with the new number of objects and repeating steps (j), (k), (l), and (m) until the new number of objects remains constant in value.

2. The method of claim 1, wherein the insignificant value is determined according to a system noise calculation, the system noise calculation comprising steps of:
   determining a brightness range;
   selecting a highest value of the brightness range;
   determining a subject noise percentage; and
   calculating the insignificant value according to the subject noise percentage of the highest value of the brightness range.

3. The method of claim 1, wherein the insignificant value is determined according to theoretical prediction comprising steps of:
   determining theoretical output of values according to an F-distribution;
   determining an exponential distribution of values; and
   calculating the insignificant value according to a value representing a match between the exponential distribution and the theoretical output.

4. The method of claim 1, wherein the step of calculating the threshold further comprises a formula:

$$T = -\mu \ln(K/N),$$

wherein T represents the threshold, $\mu$ represents the average peak value, K represents the predetermined number of false alarms, and N represents the number of identified peak values.

5. The method of claim 1, wherein the step of calculating the new threshold based on the new peak average further comprises a formula:

$$\hat{T} = -\hat{\mu} \ln(K/N)$$

wherein $\hat{T}$ is the updated threshold, $\hat{\mu}$ is the new average value, N is the new number of objects, and k is the predetermined number of false alarms.

6. A method of recognizing a target in an image having a plurality of pixels and a plurality of values, each value in the plurality of values corresponding to a respective pixel in the plurality of pixels, the method comprising steps of:
   (a) identifying and storing a peak value from the plurality of values;
   (b) identifying a pixel in the plurality of pixels corresponding to the peak value and storing a location of the identified pixel;
   (c) bounding an area around the location of the identified pixel, the area corresponding in size to an area of a known target image;
   (d) excluding from further processing each pixel within the bounded area and the value associated therewith;
   (e) repeating steps (a) through (d) until the peak value is less than or equal to an insignificant value;
   (f) calculating an average peak value from the stored peak values;
   (g) calculating a threshold according to the formula:

$$T = -\mu \ln(K/N),$$

wherein T represents the threshold, $\mu$ represents the average peak value, K represents the predetermined number of false alarms, and N represents the number of identified peak values;
   (h) calculating a number of objects having values exceeding the threshold;
   (i) identifying a highest peak value in the determined peak values;
   (j) excluding from further processing the current highest peak value, calculating a new average peak value derived from the remaining identified peak values;
   (k) calculating a new threshold according to the formula:

$$\hat{T} = -\hat{\mu} \ln(K/N),$$

wherein $\hat{T}$ is the updated threshold, $\hat{\mu}$ is the new average value, N is the new number of objects, and K is the predetermined number of false alarms;

(l) calculating a new number of objects having values exceeding the new average peak value; and (m) if the new number of objects is greater than the number of objects, then replacing the number of objects with the new number of objects and repeating steps (j), (k), (l) and (m) until the new number of objects remains constant in value.

7. A method of recognizing a target in an image, the method comprising steps of:

(a) acquiring data;

(b) converting the data to an image having a plurality of pixels;

(c) analyzing the plurality of pixels and assigning each pixel a respective value from a plurality of values;

(d) identifying and storing a peak value from the plurality of values;

(e) identifying a pixel in the plurality of pixels corresponding to the peak value and storing a location of the identified pixel;

(f) bounding an area around the location of the identified pixel, the area corresponding in size to an area of a known target image;

(g) excluding from further processing each pixel within the bounded area and the value associated therewith;

(h) repeating steps (d) through (g) until the peak value is less than or equal to an insignificant value;

(i) calculating an average peak value from the stored peak values;

(j) calculating a threshold according to the average peak value;

(k) calculating a number of objects having values exceeding the threshold;

(l) identifying a highest peak value in the determined peak values;

(m) excluding from further processing the current highest peak value and calculating a new average peak value derived from the remaining identified peak values;

(n) calculating a new threshold based on the new peak average;

(o) calculating a new number of objects having values exceeding the new average peak value; and (p) if the new number of objects is greater than the number of objects, then replacing the number of objects with the new number of objects and repeating steps (m), (n), (o) and (p) until the new number of objects remains constant in value.

8. A system for target recognition in an image having a plurality of pixels and a plurality of values, each value in the plurality of values corresponding to a respective pixel in the plurality of pixels, the system comprising:

a storage medium for storing the image and the plurality of values;

a peak value generator for identifying a number of peak values from the plurality of values, the peak value generator comprising:

an identifier and storage unit for identifying and storing a peak value from the plurality of values and identifying a pixel in the plurality of pixels corresponding to the peak value and storing a location of the identified pixel;

an area determinator for bounding an area around the location of the identified pixel, the area corresponding in size to the area of a known target image; and a comparison and repeater module for excluding from further processing each pixel in the plurality of pixels within the bounded area and the value in the plurality of values associated therewith and invoking the identifier and storage unit and area determinator until the peak value is less than or equal to an insignificant value; and a calculator for calculating an average peak value from the identified peak values derived in the previous step and calculating a threshold according to the average peak value; the number of identified peak values; and a predetermined number of false alarms.

9. The system of claim 8, wherein the insignificant value further is determined according to a system noise calculation, the system noise calculation comprising steps of:

determining a brightness range;

selecting a highest value of the brightness range;

determining a subject noise percentage; and calculating the insignificant value according to the subject noise percentage of the highest value of the brightness range.

10. The system of claim 8, wherein the insignificant value is determined according to theoretical prediction comprising steps of;

determining theoretical output of values according to an F-distribution;

determining an exponential distribution of values; and calculating the insignificant value according to a value representing a match between the exponential distribution and the theoretical output.

11. The system of claim 8, wherein calculating the threshold further comprises a formula:

$$T = -\mu \ln(K/N),$$

wherein T represents the threshold, $\mu$ represents the average peak value, K represents the predetermined number of false alarms, and N represents the number of identified peak values.

12. The system of claim 8, wherein calculating the new threshold based on the new peak average further comprises a formula:

$$\hat{T} = -\hat{\mu} \ln(K/N),$$

wherein $\hat{T}$ is the updated threshold, $\hat{\mu}$ is the new average value, N is the new number of objects, and K is the predetermined number of false alarms.

13. A computer system for threshold selection in analysis of an image having a plurality of pixels and a plurality of values, each value in the plurality of values corresponding to a respective pixel in the plurality of pixels, the system comprising:

a memory coupled to a processor, the processor operable to process the plurality of values;

(a) identify and storing a peak value from the plurality of values;

(b) identify a pixel in the plurality of pixels corresponding to the peak value and storing a location of the identified pixel;

(c) bound an area around the location of the identified pixel, the area corresponding in size to an area of a known target image;

(d) exclude from further processing each pixel within the bounded area and the value associated therewith;

(e) repeat functions (a) through (d) until the peak value is less than or equal to an insignificant value;

(f) calculate an average peak value from the stored peak values;

(g) calculate a threshold according to the average peak value;

(h) calculate a number of objects having values exceeding the threshold;

(i) identify a highest peak value in the determined peak values;
(j) exclude from further processing the current highest peak value and calculating a new average peak value derived from the remaining identified peak values;
(k) calculate a new threshold based on the new peak average;
(l) calculate a new number of objects having values exceeding the new average peak value; and
(m) if the new number of objects is greater than the number of objects, then replace the number of objects with the new number of objects and repeat the previous four functions until the new number of objects remains constant in value.

14. The computer system of claim 13, wherein the processor is further operable to:
determine a brightness range;
select a highest value of the brightness range;
determine a subject noise percentage; and
calculate the insignificant value according to the subject noise percentage of the highest value of the brightness range.

15. The computer system of claim 13, wherein the processor is further operable to:
determine theoretical output of values according to an F-distribution;
determine an exponential distribution of values; and
calculate the insignificant value according to a value representing a match between the exponential distribution and the theoretical output.

16. The computer system of claim 13, wherein the processor is further operable to calculate the threshold according to a formula:

$$T = -\mu \ln(K/N),$$

wherein T represents the threshold, $\mu$ represents the average peak value, K represents the predetermined number of false alarms, and N represents the number of identified peak values.

17. The computer system of claim 13, wherein the processor is further operable to calculate the new threshold based on the new peak average according to a formula:

$$\hat{T} = -\hat{\mu} \ln(K/N),$$

wherein $\hat{T}$ is the updated threshold, $\hat{\mu}$ is the new average value, N is the new number of objects, and K is the predetermined number of false alarms.

18. A computer readable medium for threshold selection in analysis of an image having a plurality of pixels and a plurality of values, each value in the plurality of values corresponding to a respective pixel in the plurality of pixels, the computer readable medium comprising:
(a) a code segment for identifying and storing a peak value from the plurality of values;
(b) a code segment for identifying a pixel in the plurality of pixels corresponding to the peak value and storing a location of the identified pixel;
(c) a code segment for bounding an area around the location of the identified pixel, the area corresponding in size to an area of a known target image;
(d) a code segment for excluding from further processing each pixel within the bounded area and the value associated therewith;
(e) a code segment for invoking the code segment (a) through (d) until the peak value is less than or equal to an insignificant value;
(f) a code segment for calculating an average peak value from the stored peak values;
(g) a code segment for calculating a threshold according to the average peak value;
(h) a code segment for calculating a number of objects having values exceeding the threshold;
(i) a code segment for identifying a highest peak value in the determined peak values;
(j) a code segment for excluding from further processing the current highest peak value and calculating a new average peak value derived from the remaining identified peak values;
(k) a code segment for calculating a new threshold based on the new peak average;
(l) a code segment for calculating a new number of objects having values exceeding the new average peak value; and
(m) a code segment for determining if the new number of objects is greater than the number of objects, and, if so, then replacing the number of objects with the new number of objects and invoking code segments (j), (k), (l), and (m) until the new number of objects remains constant in value.

19. The computer readable medium of claim 18, further comprising:
a code segment for determining a brightness range;
a code segment for selecting a highest value of the brightness range;
a code segment for determining a subject noise percentage; and
a code segment for calculating the insignificant value according to the subject noise percentage of the highest value of the brightness range.

20. The computer readable medium of claim 18, further comprising:
a code segment for determining theoretical output of values according to an F-distribution;
a code segment for determining an exponential distribution of values; and
a code segment for calculating the insignificant value according to a value representing a match between the exponential distribution and the theoretical output.

21. The computer readable medium of claim 18, further comprising a code segment for calculating the threshold according to a formula:

$$T = -\mu \ln(K/N),$$

wherein T represents the threshold, $\mu$ represents the average peak value, K represents the predetermined number of false alarms, and N represents the number of identified peak values.

22. The computer readable medium of claim 18, further comprising a code segment for calculating the new threshold based on the new peak average according to a formula:

$$\hat{T} = -\hat{\mu} \ln(K/N),$$

wherein $\hat{T}$ is the updated threshold, $\hat{\mu}$ is the new average value, N is the new number of objects, and K is the predetermined number of false alarms.

* * * * *